March 11, 1941.  C. H. HUGHES  2,234,174
BROAD COKE OVEN
Filed April 25, 1940  8 Sheets-Sheet 1

INVENTOR
CHARLES. H. HUGHES
BY [signature]
ATTORNEY

March 11, 1941. C. H. HUGHES 2,234,174
BROAD COKE OVEN
Filed April 25, 1940 8 Sheets-Sheet 2
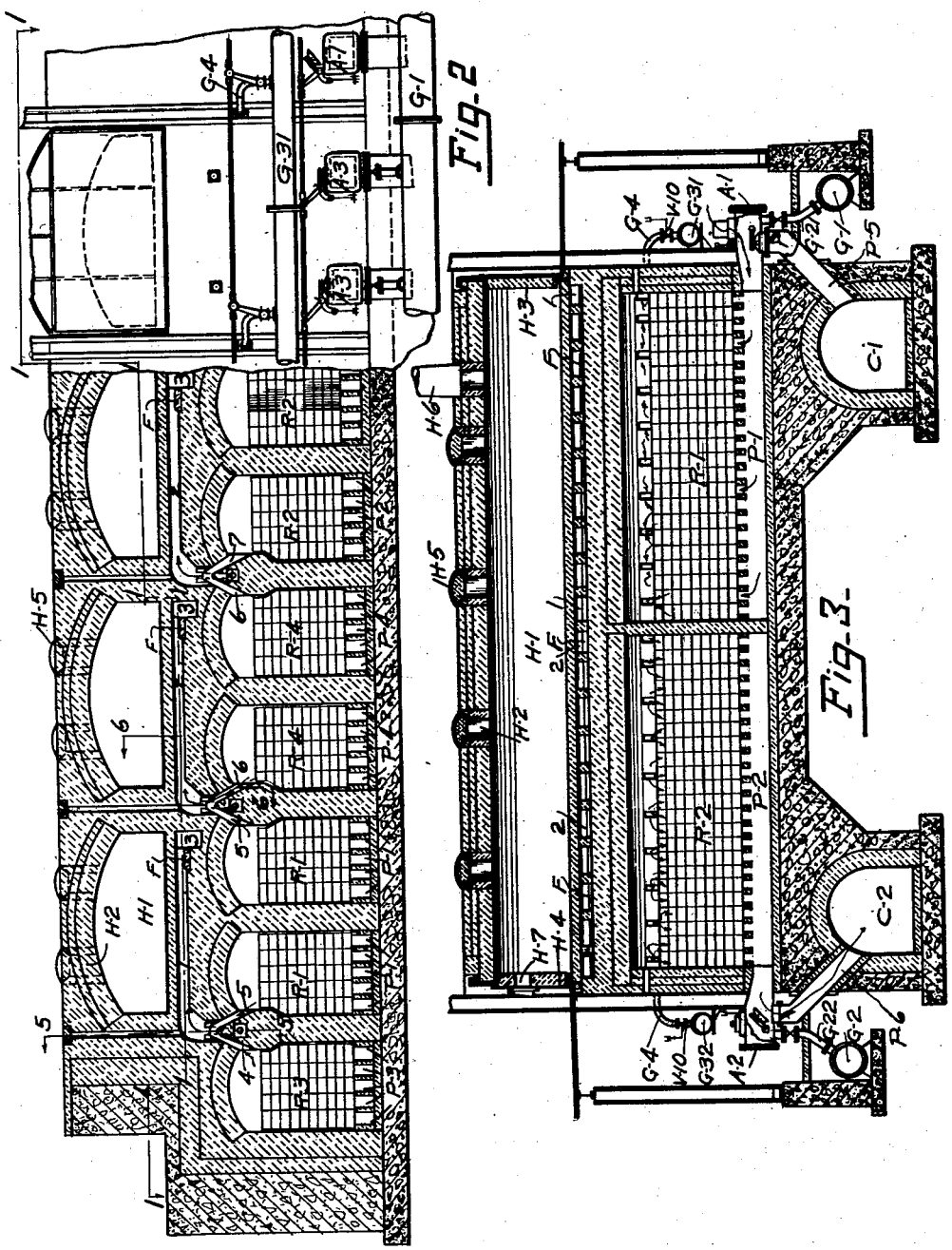
INVENTOR
CHARLES H HUGHES
BY
ATTORNEY

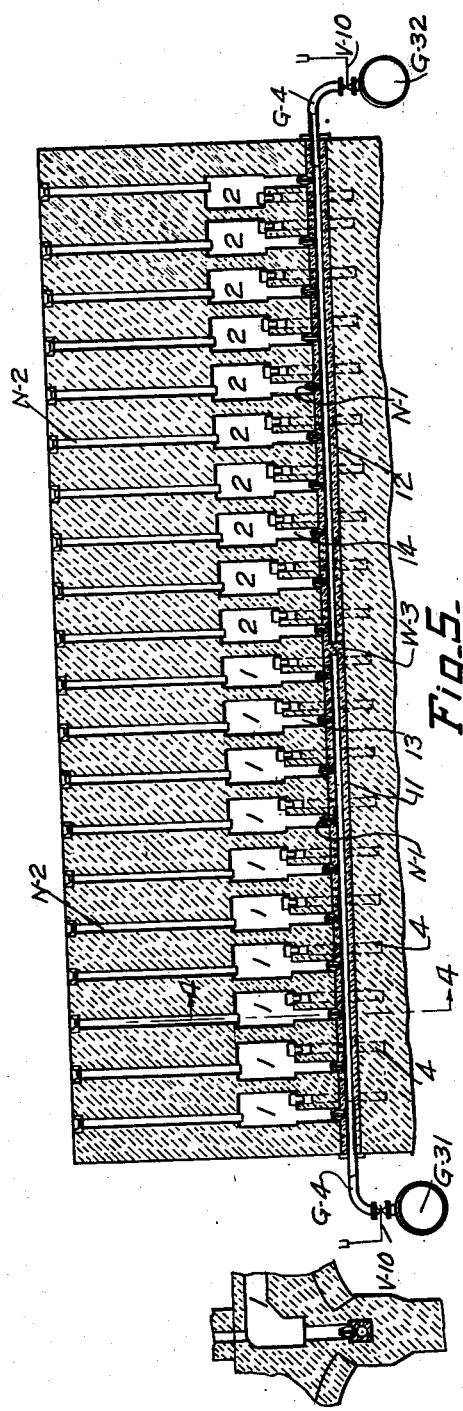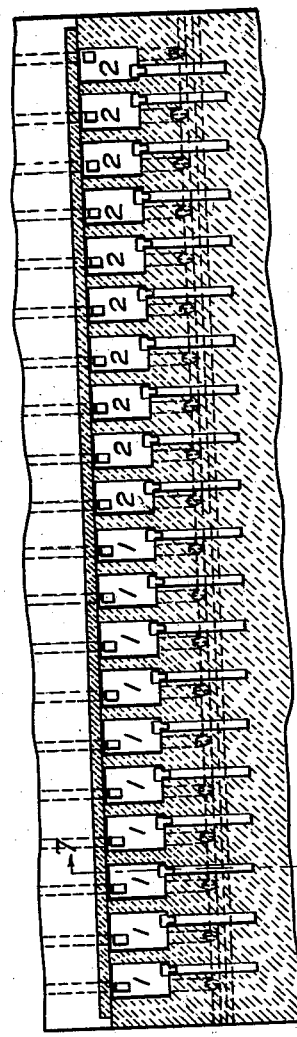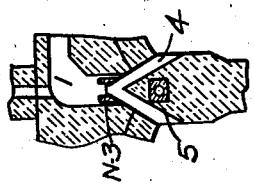

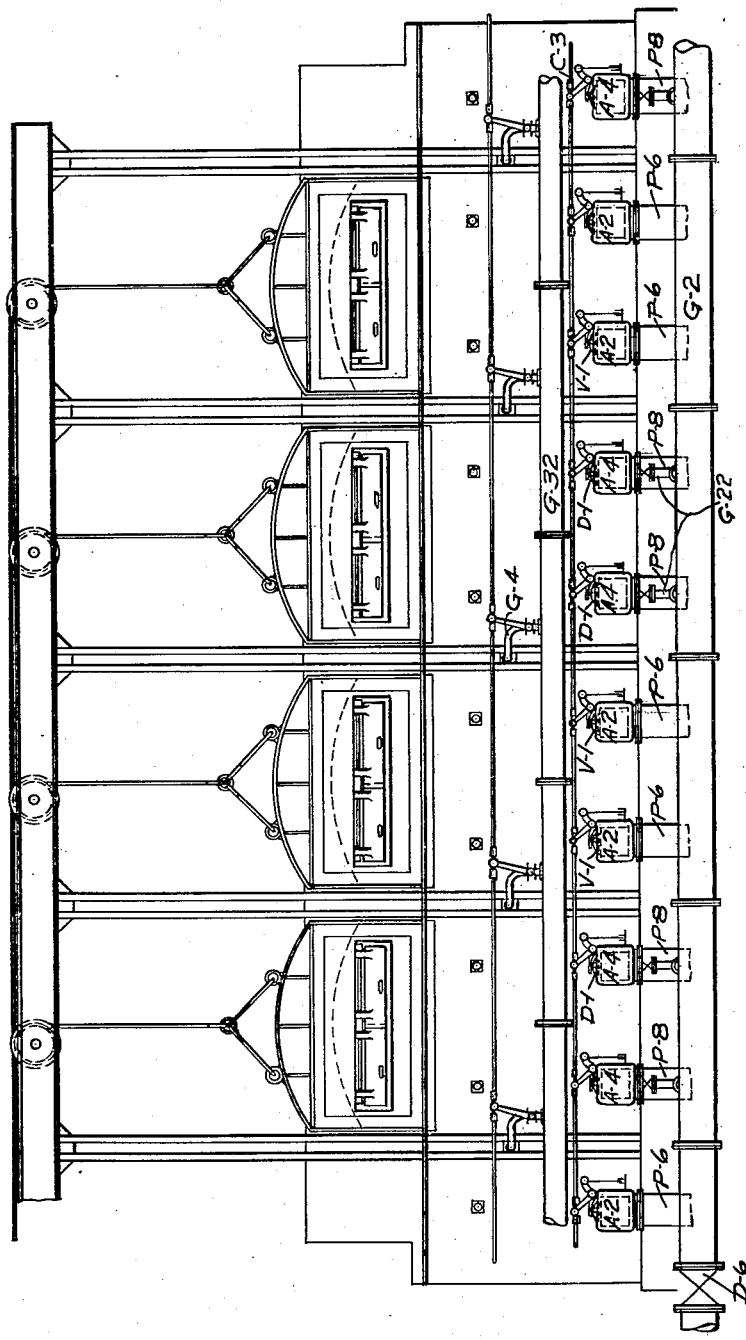

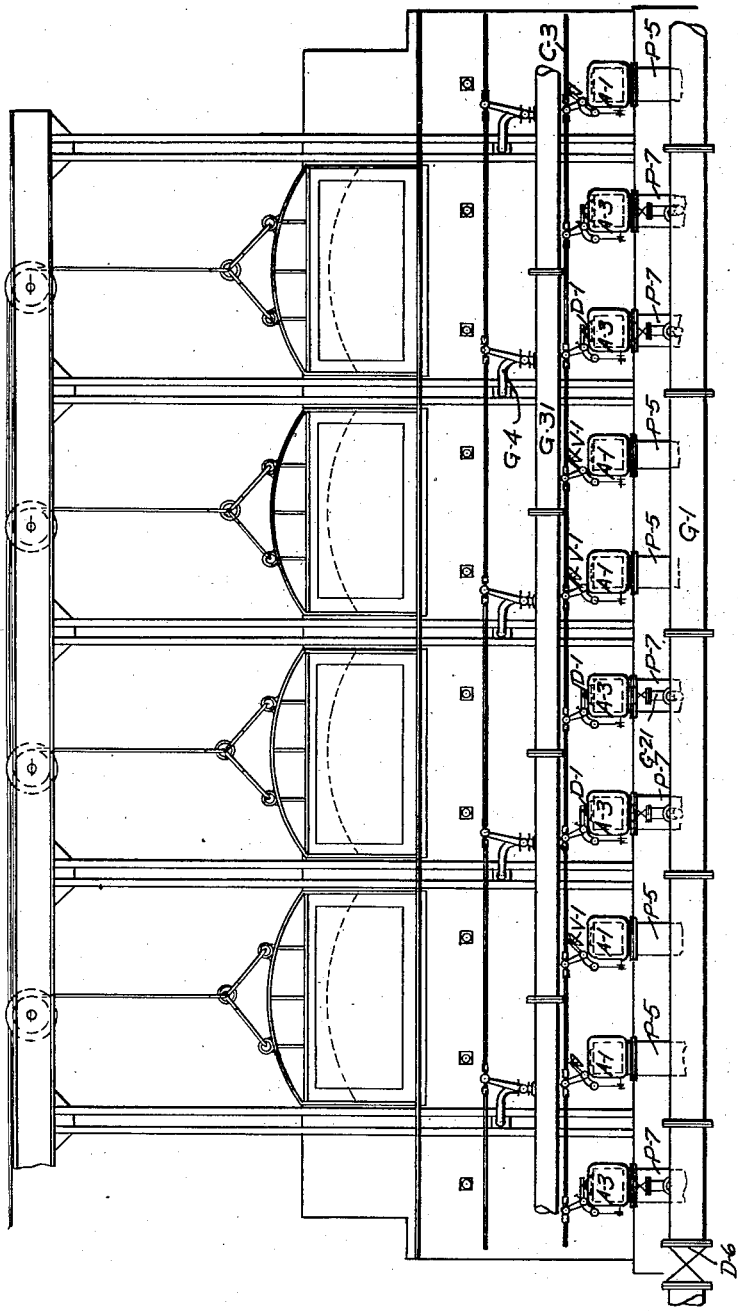

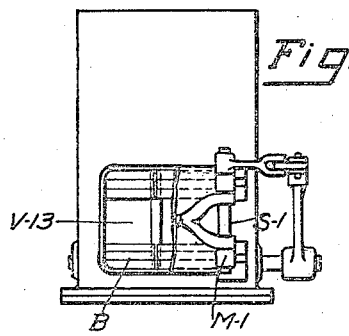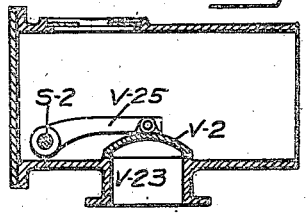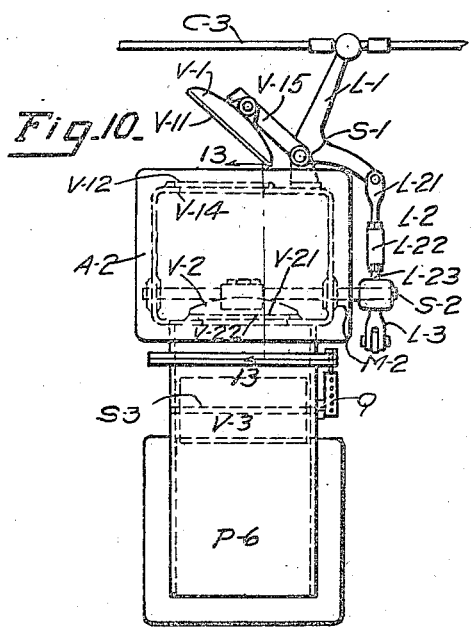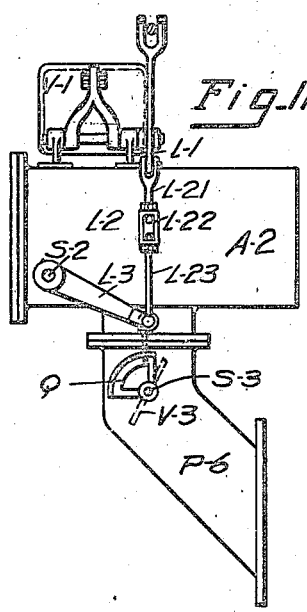

March 11, 1941.　　C. H. HUGHES　　2,234,174
BROAD COKE OVEN
Filed April 25, 1940　　8 Sheets-Sheet 7
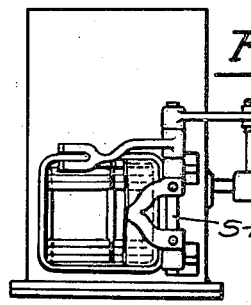
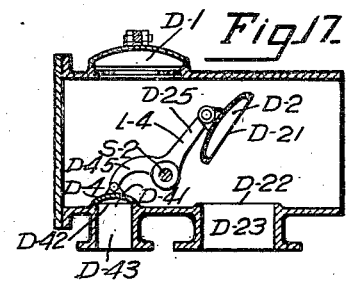
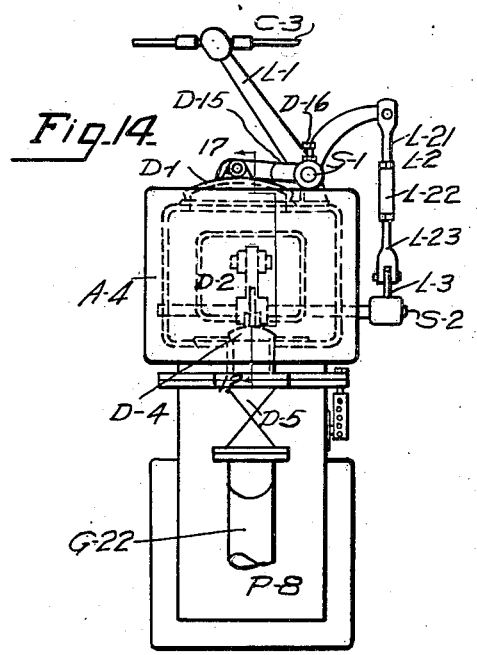
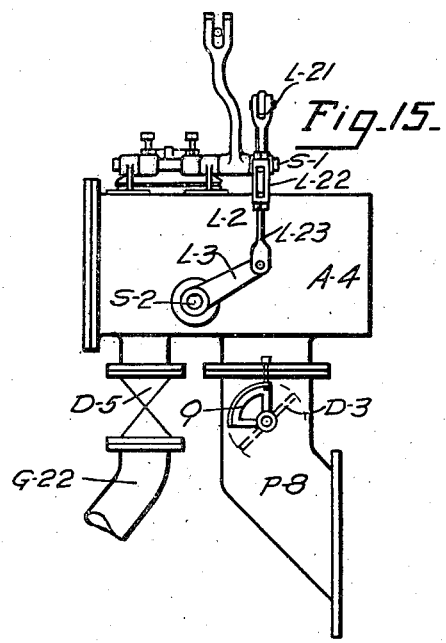
INVENTOR
CHARLES H. HUGHES
BY
ATTORNEY March 11, 1941.                C. H. HUGHES                2,234,174
                              BROAD COKE OVEN
                 Filed April 25, 1940        8 Sheets-Sheet 8

INVENTOR
CHARLES H. HUGHES
BY
ATTORNEY

Patented Mar. 11, 1941

2,234,174

UNITED STATES PATENT OFFICE 2,234,174

BROAD COKE OVEN

Charles H. Hughes, Glen Ridge, N. J., assignor to Hughes By-Product Coke Oven Corporation, New York, N. Y., a corporation of New York Application April 25, 1940, Serial No. 331,589

13 Claims. (Cl. 202—102)

The present invention relates to a rectangular coke oven and, more particularly, to a coke oven of the foregoing type capable of being heated either by lean fuel gas, such as producer or blast furnace gas, which for efficient operation requires preheating, or alternatively by rich fuel gas, such as coke oven gas, which requires no preheating.

It is well known by those skilled in the art that in the earliest times coke was produced in mound-shaped Meilers similar to the old method of burning charcoal in heaps. The beehive oven was a modification of these, except that it was built of brick instead of sod or clay, and the earliest record of coking coal in a regular oven is an English patent to St. John granted in 1620 for making coke in a beehive form of oven. Although a German chemist, Becher, received a patent in 1700 for recovering tar from coking coal, it appears that it was not until Clayton's discovery in 1737 that the formation of a combustible gas when coking coal was noticed. About the year 1767, a form of coke oven, producing coke and recovering some tar and ammonia, was constructed in Germany and was described as a dome-like fire clay retort. In 1781, an attempt appears to have been made to recover the by-products, and a patent to the Earl of Dundonald was issued, and in 1792 Murdoch experimented with making gas from coal in retorts. These efforts bore fruit, and twenty years later the streets of London were lighted by gas.

The earliest records of the rectangular, or retort, ovens show them in operation in Germany about 1830. They had open walls, pierced by horizontal and vertical flues, and the walls formed a rectangular space which contained the charge. In 1856, Knab is reported to have built a group of retort coke ovens to recover by-products and illuminating gas. These ovens had flues on the bottom only, but of course, no regenerator or recuperator system was provided. Moreover, there was no attempt to furnish uniform heating to the oven sole, the fire or flame passing from a grate through a central flue and then returning through the flues on both sides thereof. The following year, Appolt built his first ovens in the shape of vertical and, later, horizontal retorts, using his gas only for heating his oven through horizontal flues. This was about the earliest closed retort coke oven, utilizing the gas for its own heating. By 1861 the Coppee coke oven of Belgian invention was in use on the Continent, and in 1873–74 it was introduced into England. It had vertical flues and was of the non-recovery type.

About 1862 Carves of France introduced side flues in addition to the bottom flues of Knab. About 1880, Simon, an English inventor, improved the Carves oven very materially by adding recuperating flues. This oven had the oven flues placed horizontally, the gas and air being first burned in sole flues located underneath the oven chambers, then passing up through a riser to the ovens and down through three horizontal flues in series. In the years 1881 to 1883, Seibel patented an oven having horizontal flues and having neither grates nor regenerators. It is apparent that oven designs up to this time were so uneconomical of gas used in heating the ovens, or the coals were so lean in gas, that grates for burning coal were built into the ovens and the gas was first admitted over these grates, the amount of coal being such as to supply the required additional heat.

The first ovens of the Otto type had been erected in Germany in 1881, and in the same year Huessner appropriated the Knab-Carves model and built a hundred ovens in Germany, thus establishing the industry on a sound basis in that country, although the quality of coke from these ovens was inferior. In these ovens the flues were horizontal. A very substantial improvement was made by Hoffman, who added the Siemens regenerator to the Otto coke oven and thus provided the first really efficient coke oven, generally referred to in the art as the Otto-Hoffman coke oven. In 1888 Festner, a German inventor, changed the Otto-Hoffman design by using horizontal instead of vertical flues and abandoning the Siemens regenerators, replacing the same with a Ponsard gas furnace. Hoffman cooperated with Festner, and this design was called a Festner-Hoffman oven, having horizontal flues and recuperators. In 1887, the Semet-Solvay oven came into notice, the first of them having no recuperators or regenerators. It appears that the principal features of Semet's design were the introduction of the division wall, the building of the oven flue system as a sleeve out of D-shaped tile, and the starting of the combustion at the top, or No. 1, flue, and, in general, providing a structure which was strong, easily heated and had a reservoir of heat in the division walls.

From the foregoing historical survey of the development of the coke oven art, it appears that all designs of ovens for coking coal sprang from four roots classified as follows:

1. The beehive oven, which was developed from the mound of charcoal burners.

2. The Coppee oven, with vertical flues in the oven walls, these ovens being built narrow, long and high.

3. The Knab broad oven, with flues underneath.

4. The Knab oven modified by Carves, with the oven flues horizontally in the side walls as well as underneath.

The high, narrow coke ovens of the prior art described in the foregoing had various important disadvantages. For instance, a recent standard type was usually of the order of about 45 feet in length, about 16 feet high, and about 17 inches in width, and, because of its height and narrowness, it had to be constructed and built in very large individual units, so that the original cost of installation was extremely high. Generally speaking, it was not possible either to build or to operate relatively small units of the conventional type at a low cost.

Besides these economic disadvantages, the use of a high, narrow oven was limited to certain coals or coal mixtures. Coals which expanded upon coking could only be used if mixed with shrinking coals, as otherwise the wear on the walls was too great, and the increasing pressure might have led to destruction of the ovens. Using a large percentage of shrinking coals, as necessarily became general practice, the coal shrank away from the heating walls, causing the formation between coke and wall of irregular gaps and crevices which acted as channels for the gases distilled from the coal. Due to the irregularity of these channels heat could not be applied so as to produce a uniformly carbonized coke in a short coking period, regardless of the method of heating or control employed.

It is well known in the art that channeling brought the rich gases into immediate contact with the highly heated refractory walls, producing two unfortunate results. First, the contact of the crude gases with some 1440 square feet of brick at the highest temperature in the oven caused the destruction of a part of the valuable by-products contained in the gases. Secondly, the gases acted as an insulator between the hot walls and the coking coal, preventing considerable heat from reaching the charge by conduction. Again, the gases, being much lower in temperature than the walls, took up considerable heat from them and thus prevented this amount of heat from reaching the core of the charge at all. Both of these effects resulted in greatly retarding the coking time and were diametrically opposed to the results desired, for it was, of course, the purpose of the operation to transfer heat from walls to coal charge as efficiently as possible and in the shortest time. Moreover, the heating of the gases had the undesirable effect of passing the gases to the byproduct plant in a super-heated state, necessitating larger condensing surfaces to cool them.

A further disadvantage of the high narrow coke oven was that the width of the charge varied over the length of the oven, for practical reasons being smaller at the pusher end than at the coke discharge end. For the purpose of providing uniform coking throughout this constantly varying oven width, more gas had to be burned in the flues at the coke end of the oven, necessitating a difference in size of heating flues over the length of the oven. This required very accurate control of the fuel gas to the individual flues.

Under these conditions, it was difficult to control heating conditions in these ovens, the oven structure was intricate and expensive, resulting in high-cost coke, and the coke produced was primarily suitable only for metallurgical purposes and not for domestic use. The pressure in the plastic mass resulting from a deep, narrow charge materially affected the coke structure, so that a hard, dense, slow-burning coke having a close cell structure was necessarily produced. Coke for domestic use should have an open, free-burning cell structure, and, although the surplus coke produced in high, narrow ovens was sold for domestic uses, such coke was really only suitable for metallurgical purposes.

Subsequently, a broad rectangular sole-fired coke oven attempting to eliminate these disadvantages was developed, but other difficulties arose. Essentially, this broad oven construction provided a rectangular sole-fired coke oven having a multiplicity of long, independent, parallel heating flues arranged side by side, each of said flues being directly connected at each end to two shallow, horizontal hair-pin regenerators below and parallel to and individual to each separate heating flue for alternately supplying heated air to the flues and receiving the heat of waste gases discharged therefrom. Each heating flue was provided with a burner or means for supplying rich fuel gas to both ends thereof.

In this manner, all of the flames burned in independent flues, entirely isolated from each other. These flames were all at one end of the long oven and extended in the direction of the other end, usually some forty-odd feet away. Burners were located at each end of the flues, and each heating flue and its associated regenerators could thus be alternately operated, independently of adjoining heating flues and regenerators.

It is particularly to be noted that the oven described could be used with rich fuel gas only, as no provision was made for preheating the fuel. Since efficient operation with lean fuel gas required that it be preheated before passing to the burners, it is obvious that this oven was limited as to its source of heat. This raised a serious problem, as the prices at which fuel gas could be bought or manufactured fluctuated considerably, and it was not at all unusual for the costs of lean and rich gas so to vary with respect to each other that they actually competed with each other for a market. Operators could not take advantage of this economic situation, of course, when they could not possibly employ the lean gas.

Although this conventional type of broad oven could be built in relatively small units, the entire heating system and the so-called regenerators employed were fundamentally incorrect. The oven was designed for underfiring with rich coke oven gas only. The use of coke oven gas with preheated air gave a short and hot flame resulting in nonuniform heating of the long, straight parallel heating flues. An excessively high temperature occurred at each burner, producing danger points or hot spots. Moreover, the regenerators were so designed that the waste gas and incoming air always circulated in a horizontal direction which failed to give satisfactory and efficient results.

In other words, by eliminating some of the disadvantages of prior ovens, the broad oven described introduced new difficulties which were in part much more serious than the former. Thus, the ends of the heating flues were overheated, causing overcoking and quick overheating of the construction material of the oven. The heat thus furnished in excess at the ends of the flues did not, however, propagate itself in sufficient amount along their length. The flues were so long, running (as they did) the entire length of the oven, that black spots, too cold for proper coking, developed at their centers. Clearly, it was practically impossible to obtain proper coking of the center mass except, and then to only a small extent, by overcoking the masses at the ends of the flues. While this defect was sought to be remedied by another experimenter, who put a division wall at the center to halve the flue length and simultaneously burned flames at both ends of the oven toward this wall, this arrangement provided no real solution to the problem. It merely substituted for the oven-length flue a semi-oven-length flue, still far too long for the flame to heat it properly. There were still cold black spots at the oven centers in the vicinity of the division wall.

Then, too, the broad oven described did not provide adequate space above and below the regenerators in which the gases could spread or mushroom out before going through the checker-brick. Moreover, the regenerators, which were individual for each flue, were insufficient in size and could not function satisfactorily. The velocity of the gases in the heating flues was too low and in the regenerators too high for proper heat transfer. Of course, not only did this non-uniform distribution of heat greatly decrease the over-all efficiency of these ovens, but, especially, the hot spots, developed in the operation of the oven, caused early deterioration of the building material and greatly increased the cost of operation and maintenance. Although these difficulties were well known in the art, and, from time to time, various suggestions and proposals were made to eliminate them, none of these suggestions and proposals, so far as I am aware, was completely satisfactory and successful on a practical and industrial scale.

I have discovered that the outstanding problem may be solved in a simple and completely satisfactory manner.

It is an object of the present invention to provide a by-product coke oven which eliminates the aforementioned difficulties and disadvantages in the construction and operation of conventional broad coke ovens.

It is another object of my invention to provide a by-product coke oven in which various coals, tars and oils can be used to produce a coke substance with burning characteristics different from those of coke produced heretofore in high, narrow ovens or beehive coke ovens.

It is a further object of the invention to provide a low-cost broad coke oven which is adapted to produce coke having an open, freeburning cell structure, thereby providing a coke oven which is suitable for furnishing a fuel supply of gas and coke for domestic use.

It is also the intention of the present invention to contribute a convertible by-product coke oven which can burn either rich fuel gas or, alternatively, preheated lean fuel gas to heat the oven, such change in operation being easily, quickly and inexpensively accomplished, thereby allowing the operator to take full advantage of price differentials and other economic factors.

It is also an object of the invention to incorporate in the same brick structure of broad ovens two systems of heating the ovens, in such manner that, when rich fuel gas is used for underfiring, regenerators employed for preheating lean fuel gas during operation therewith can be adapted for preheating air in parallel with adjacent air-preheating regenerators.

My invention also provides in the same brick structure of broad ovens a dual heating system and a regenerator system in combination therewith, whereby a set of generators is located below and upon each side of each oven division wall in a battery in such manner that preheated air and preheated lean gas can be brought together and mixed in required proportion at one end of each heating flue or, alternatively, that air can be preheated in both sets of regenerators and properly mixed at the burner end of each heating flue with rich fuel gas supplied by means of a conduit passing longitudinally through the division wall, thereby affording flexibility of operation, through ability to use either lean or rich fuel gas, together with appreciably lower capital investment and diminished maintenance costs.

Another object of my invention is to provide a by-product coke oven in which the direction of flow of the hot gases through the heating flue system can be reversed, thereby insuring uniform heating over the entire floor of the oven.

The present invention also has in prospect the provision, in the same brick structure of broad ovens, of a dual heating system and a regenerative system in combination with chimney flues located on both sides of the oven battery and common to every oven in the battery, thereby affording reversal of the circulation through the heating flues from side to side of the oven battery and symmetrically about its center line.

The invention also contemplates the incorporation in broad ovens of a novel combination of structural elements which are arranged to cause the gas which is being heated to ascend and to cause the gas which is being cooled to descend, whereby uniformity of flow and an effective change of temperature of the different streams are obtained.

It is also within the contemplation of the invention to incorporate in broad by-product coke ovens a regenerative system so designed and constructed that air and lean gas being preheated therein are constrained to flow upward simultaneously in parallel streams, the streams finally converging to merge at one end of each heating flue, thereby providing a regenerative system adapted to supply to the heating flues a properly proportioned combustion mixture.

Still another object of my invention is to provide a broad coke oven construction wherein the heating flue system of each oven is symmetrical about the longitudinal center line of the oven battery, each side of the heating flue system communicating with a separate regenerative assembly designed alternately to recover heat from the hot waste products of combustion and to preheat lean fuel gas and air or, alternatively (where rich fuel gas is employed), air only.

This invention has the additional purpose of providing a broad coke oven having a large number of parallel, horizontal heating flues beneath the oven floor interconnected at one end thereof and transversely disposed with respect to the longitudinal axis of the oven, thereby providing an extremely short flue all of which can be sufficiently heated for full coking by a flame burning at a single end.

The invention further proposes to incorporate, in a sole-fired, rectangular, broad, by-product coke oven, a system of flues so disposed therein as to afford parallel, lateral flow of the gaseous heating medium.

Moreover, the invention has in view the contribution of a by-product coke oven of novel and improved character providing an increased and positive control of the air to be preheated and of the waste gas from the oven.

In addition, this invention provides a by-product coke oven of such design that swelling coals can be coked therein without damage to the oven structure.

My invention also provides a broad, rectangular sole-fired, by-product coke oven which can be operated with equal facility and economy with either lean or rich fuel gas, which is simple in construction and of high structural strength and which can be built and operated in relatively small units on a practical and industrial scale at a low cost.

Other and further objects and advantages of the invention will become apparent from the following description taken in connection with the accompanying drawings, in which—

Fig. 2 depicts a fragmentary front elevational view, partly broken away to reveal a vertical transverse section through the ovens, heating flues and regenerators, taken on line 2—2 of Fig. 1;

Fig. 3 shows a vertical longitudinal sectional view through the oven, heating flues, regenerators, valve boxes and chimney flues, taken on line 3—3 of Fig. 1;

Fig. 4 is a vertical cross-section through one of the rich gas ports connecting the gun bricks with the heating flues, taken on line 4—4 of Fig. 5;

Fig. 5 illustrates a vertical longitudinal section through the gun brick, rich gas burner nozzles, heating flues and burner inspection holes, taken on line 5—5 of Fig. 2;

Fig. 6 is a similar view through the ducts connecting the heating flues with the regenerators, taken on line 6—6 of Fig. 2;

Fig. 7 shows a vertical cross-section through the air and lean gas ports which connect the regenerators with the heating flues, taken on line 7—7 of Fig. 6;

Figs. 8 and 9 depict front elevational views of the pusher and coke sides, respectively, of the oven battery, showing the gas and air boxes and the gas manifold piping;

Figure 19:
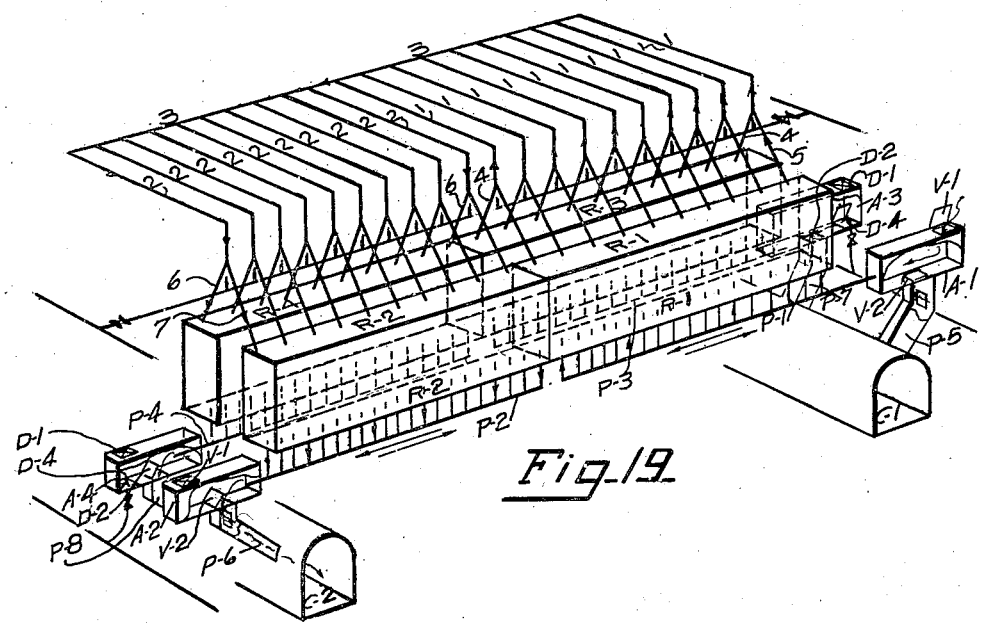
Figure 18:
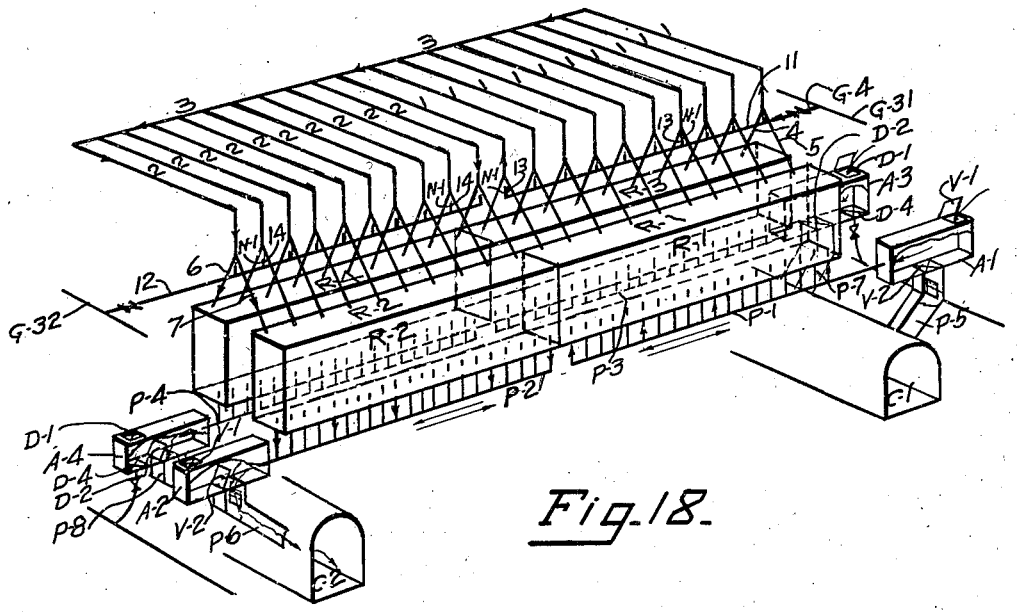

Figs. 10, 11, 12 and 13 reveal the details of construction of a single box for air and waste gas;

Figs. 14, 15, 16 and 17 show the structural details of a single box for lean fuel gas and waste gas;

Fig. 18 depicts a perspective view, showing the circulation through the various parts of the oven structure when underfiring the oven with rich fuel gas and preheated air; and Fig. 19 illustrates a similar perspective view, showing the circulation through the heating flues, regenerators, air boxes, gas boxes, fuel gas manifolds and chimney flues when underfiring with preheated lean fuel gas and preheated air.

Broadly stated, according to the principles of the present invention, a broad rectangular coke oven is provided, having a dual heating system adapted to operate with either lean or rich fuel gas. In this duplex adaptability, the present oven bears resemblance to the oven described in my copending application, Serial No. 301,173, filed October 25, 1939. The heating system consists of a plurality of short, parallel heating flues located beneath the floor of the oven and placed transversely to the oven, all interconnected at one side of the oven by a passage running its entire length. Means are incorporated in the oven structure for reversing the flow through the heating system of preheated lean fuel gas, preheated air, and waste gas, using valves upon both sides of the oven battery and using two chimney flues alternately, one chimney flue being located on each side of the battery below the regenerators and serving all of the ovens in the battery in common. The circulation is maintained by the use of combination air and waste gas boxes and of combination lean fuel gas and waste gas boxes, equipped with the necessary valves. These boxes are provided on both the pusher and coke sides of each oven for the accurate control of the air entering the regenerator and in order to control the draft for each oven. The combination lean gas-waste gas boxes are adapted to be converted for the passage of air and waste gas when the ovens are being fired with rich fuel gas.

The heating system may be said to be divided into two sections, the hot gases flowing in them in opposite directions and each section being provided with two parallel vertical regenerators. These regenerators have spacious, chamber-like passages both above and below the checkerbrick, giving the gases an opportunity to spread or mushroom out before passing through and thus increasing the time of contact and affording more effective heat transfer. Each regenerator is constructed and arranged to preheat either air or lean fuel gas and, on alternate reversals, to recover the heat from waste gas. As has been said, the improved oven is so designed that it may also be used for underfiring with rich fuel gas. When rich fuel gas is used, all regenerators are employed alternately for preheating air for combustion and for recovering heat from hot waste exit gases.

The invention will now be more fully described to those skilled in the art, references being had to the accompanying drawings illustrating a preferred embodiment of the present invention. Similar reference characters denote corresponding parts throughout the various figures.

Figure 1:
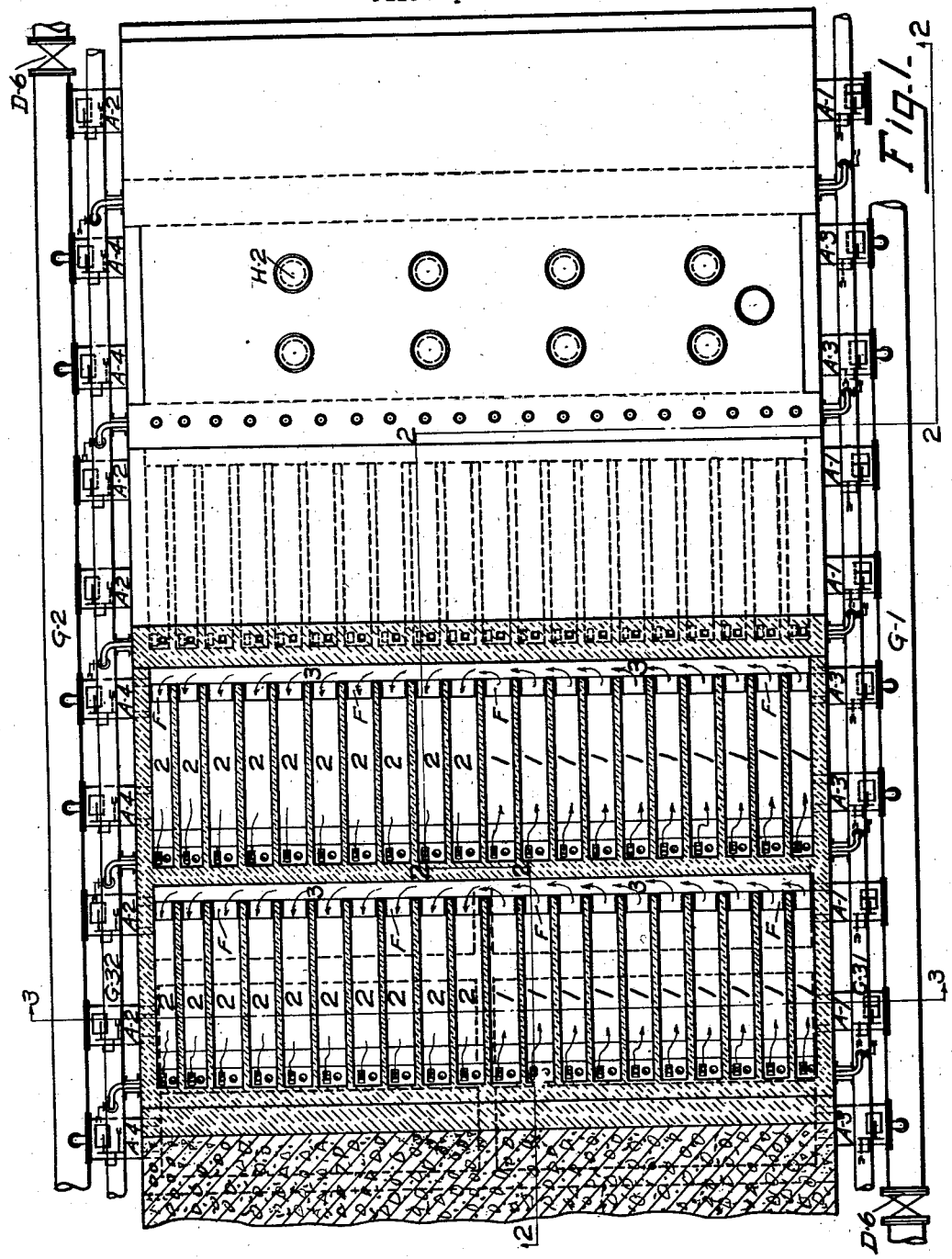
Fig. 1 illustrates a sectional plan view of an oven embodying the principles of the present invention, taken on line 1—1 of Fig. 2.

Referring, now, more specifically to Figs. 1 to 3, it is readily observed that the oven battery of my invention comprises a plurality of domed, rectangular, broad coking chambers H—1 having charging holes H—2 in their roofs. Beneath each of these chambers are arranged in transverse position a plurality of parallel heating flues, one half of which are denoted by reference character 1; the other half are denoted by reference figure 2. All of these heating flues are connected at one end thereof with a common longitudinal flue 3. Filler blocks F are preferably placed in the end of each transverse heating flue adjacent to the longitudinal flue, and these blocks, taking up the full width of the flues, vary in height. As shown in Fig. 3, each succeeding block increases in height from the flues under the ends of the oven to those beneath its center, thus varying the effective area of the heating flues in inverse proportion thereto. Heating flues 1 are connected at the other flue end with ducts 4 and 5 and, through these ducts, to regenerators R—3 and R—1, respectively. Heating flues 2 are connected at the other end thereof with ducts 6 and 7, and through these ducts, to regenerators R—4 and R—2, respectively. This end of the heating flues, where the connecting ducts to the regenerators open into the flues to form a Y-junction, is the firing end, and burning means is here provided. The oven is provided with valvular means, such as the four combination valve or damper boxes A—1, A—2, A—3 and A—4, preferred constructions of which will be described infra. Regenerator R—1 is connected by a passage P—1 with valve box A—1 and thence by a passage P—5 with chimney flue C—1. Passage P—1 runs underneath the entire length of regenerator R—1, and the whole top of the passage is open to the mushrooming chamber under the checkerbrick of the regenerator. Passage P—2 runs under regenerator R—2, where it communicates directly with the mushrooming chamber under the checkerbrick. Regenerator R—2 is connected by this passage to valve box A—2 and through this valve box and passage P—6 to chimney flue C—2. Similarly, regenerator R—3 is connected by a passage P—3 to valve box A—3 and through this valve box and a passage P—7 (see Fig. 9) to chimney flue C—1. Likewise, a passage P—4 runs under regenerator R—4 and communicates therewith in exactly the same manner that passage P—1 connects with regenerator R—1. Regenerator R—4 is connected through the passage P—4 to valve box A—4 and thence by passage P—8 (see Fig. 8) to chimney flue C—2.

Lean fuel gas manifolds G—1 and G—2 run the length of the oven battery on the coke and pusher sides, respectively, and they are connected by risers G—21 and G—22 to valve boxes A—3 and A—4, respectively, on each oven. Rich gas manifolds G—31 and G—32 run the length of the oven battery on opposite sides thereof and connect through valves V—10 (shown diagrammatically) with risers G—4, which lead into gas supply channels in the division walls between the ovens. The valves in the gas connection pipes G—4 are connected in the usual manner by a cable to the drum of a standard reversing mechanism (not shown), or other valve-actuating means can be employed.

A reference to Figs. 5 and 6 will afford those skilled in the coke oven art a ready understanding of the construction at the firing end of the transverse flues into which the gas supply channels lead. Extending crosswise of the oven battery in the division walls between the ovens, which is to say at the firing end of the transverse heating flues, are two gas supply channels of gun brick 11 and 12. These gun brick are not connected at the point of meeting on the center line of the oven battery, but are separated by a division wall W—3. The gun brick 11 on the coke side of the battery is connected through the valve controlled connection pipe G—4 with gas manifold pipe G—31, while the gun brick 12 on the pusher side is connected through the valve controlled connection pipe G—4 with gas manifold pipe G—32. The gun brick 11 is connected by a series of ducts 13 to each of heating flues 1, and similarly channel 12 connects with heating flues 2 by ducts 14.

Within ducts 13 and 14 are orifice gas nozzles N—1. Above them, running from the top of the heating flues to the top of the oven, are openings N—2, through which a special tool may be employed either to replace these nozzles with other nozzles or to regulate the flow of preheated air (or lean gas, when used) from ducts 4, 5, 6 and 7 into heating flues 1 and 2. A detail of the Y-junction point of ducts 4 and 5 into flue 1 is depicted at Fig. 7. Each Y-junction from the ducts above the regenerators into the heating flues is provided with a pair of sliding bricks N—3, the position of which determines the size of the port and hence regulates the flow.

The valve boxes may be of any suitable design and appropriate construction, as those skilled in the art will readily understand. It is preferred, however, to use the two types of valve boxes illustrated, respectively, by Figs. 10 to 13 and Figs. 14 to 17. It is to be observed that the preferred form of valve box adapted to handling air and waste gas, as illustrated in Figs. 10 to 13, has a single housing A—2 (or A—1), preferably a suitable metal casting, as of a corrosion-resistant material, such as alloy cast iron of the chromium or the chrome-nickel type or the like. Both right and left hand boxes are required, the boxes being identical in design but mirrored as to each other in assembly, depending upon whether they are on the pusher or the coke side of the oven, as shown in Figs. 8 and 9. Since valve boxes A—1 and A—2 are of similar construction, only box A—2 will be described.

There is mounted at the top of the box an air inlet damper or valve V—1 of rectangular shape with rounded corners, the face V—11 of which is adapted to make a substantially air-tight contact with the seat V—12 of a rectangular port V—13 in the top of the box or housing. Slightly projecting shelves V—14 on each of two opposite sides of the opening V—13 just below seat V—12 provide a seat upon which removable air-regulating bars B can be placed. The valve V—1 is supported by a valve stem V—15 which is keyed to a rotatable shaft S—1. The shaft is held in position by a suitable sleeve mounting M—1 which is rigidly fastened to the housing.

Inside the valve chest thus formed, there is mounted a waste gas exit damper or valve V—2, the face of which, V—21, is adapted to make a substantially air-tight contact with the seat V—22 of a port V—23 at the bottom of the box. This port forms the upper end of passage or duct P—6 which connects the valve chamber with the chimney flue C—2. The valve V—2 is supported by valve stem V—25, which is keyed to a rotatable shaft S—2. This shaft is mounted in a suitable sleeve mounting M—2, which is rigidly fastened to valve box A—2, and the shaft extends through the side of and outside the box.

Keyed to one end of rotatable shaft S—1 is the fulcrum of a bell crank L—1. The bell crank has a straight arm which is connected by a suitable connection to a cable C—3 which runs around the entire battery of ovens. The other arm of the bell crank is curved outward and over the edge of box A—2 and at its end it connects with an adjustable rod L—2. This rod comprises three parts: the upper part L—21, connecting at the upper end thereof with the bell crank and with its lower end threaded; a turnbuckle L—22 which is screwed onto the threaded end of L—21, and a lower part L—23, having either a swivel or a thread at its upper end adapted to coact with L—22 and connected at its lower end to a lever L—3. Lever L—3 is keyed to the end of shaft S—2 which protrudes from the side of the valve box. The turnbuckle is adjusted to make rod L—2 of such length that air valve V—1 is open when waste gas damper V—2 is tightly closed, and vice versa.

In passage P—6 there is a rectangular plate damper V—3 adapted to close off the passage in any degree required. It is mounted on a shaft S—3 which forms its longitudinal axis. This shaft extends the width of the passage, and one end of it passes through the side of the passage. The shaft is suitably mounted in the sides of passage P—6. To the end of shaft S—3 which protrudes from the side, a quadrant Q is attached.

The reversing mechanism for operating the air and waste gas dampers is not shown, as those skilled in the art are familiar with the construction and operation. It may be briefly described as consisting of a motor-driven drum around which the cable C—3 is wound. A time clock, which is set for fixed reversal periods, is adapted to make the necessary electrical contacts required for starting and stopping the motor and for shifting the gears which change the direction of travel of cable C—3. The cable is adapted for alternately opening and closing all dampers as required. As the valve boxes on opposite sides of the oven are mirror assemblies of each other, the same travel of cable C—3 which opens air valve V—I and closes waste gas valve V—2 on the pusher side box A—2 closes air valve V—I and opens waste gas valve V—2 on the coke side box A—I.

The valve box which I prefer to use for handling lean fuel gas and waste gas is very similar in design and construction to the air and waste gas valve box just described. Likewise, both right and left hand boxes, on opposite sides of the oven, are provided, as with the air-waste gas valve boxes. Each box, too, has a single housing A—4 (or A—3), preferably of the same material as that of housing A—2. The same system of levers and shafts is used as described supra, so that, except for a few salient differences, no detailed description will be given here. The reference characters in Figs. 14 to 17 have been kept the same as far as possible, merely using a different initial letter, where necessary for identification. Figs. 14 to 17 depict a fuel gas-waste gas valve box A—4 on the pusher side of the oven, the same side that has the air-waste gas valve box A—2, illustrated in Figs. 10 to 13. Figs. 14 to 17, however, show the positions of the valves in box A—4 during the alternate reversal from that used in depicting box A—2 in Figs. 10 to 13. Thus, the travel of cable C—3 to the right is shown in Figs. 10 to 13, whereas Figs. 14 to 17 reveal the cable in its position after having traveled to the left.

Referring, now, to Figs. 14 to 17, air inlet valve or damper D—I is mounted in a position similar to that of valve V—I in housing A—2. The valve stem D—15 is mounted with a set screw D—16, however, adapted to key or unkey the stem to shaft S—I. By this device the air inlet valve D—I is adapted to be governed by or freed from the movements of cable C—3 (as transmitted by bell crank L—I and shaft S—I), depending upon whether rich gas or lean gas is used. Thus, when using lean gas, valve D—I remains closed.

Cable C—3 is connected to shaft S—2 of valve box A—4 by means similar to the means connecting the cable to shaft S—2 of box A—2, described above. Upon the bottom of box A—4, however, there are two ports. The larger one D—23 opens into passage P—8, which connects it with chimney flue C—2. The smaller port D—43 opens into riser G—22 from lean fuel gas manifold G—2. It will, of course, be understood that in valve boxes A—3, which are on the coke side of the oven and are of similar construction to boxes A—4, the ports at the bottom of the valve chest open, respectively, into passage P—7, which communicates with chimney flue C—I, and into riser G—21 from lean gas manifold G—I. Returning to valve box A—4 in Figs. 14 to 17, keyed to shaft S—2 within the valve chest thereof is the fulcrum of a bell crank L—4, its two arms forming the valve stems D—25 and D—45, respectively, of two valves D—2 and D—4. Valve D—2 is the waste gas exit damper, and its face D—21 is adapted to make a substantially air-tight contact with the seat D—22 of port D—23. Similarly, the face D—41 of lean gas inlet valve D—4 is adapted to make a substantially air-tight contact with the seat D—42 of port D—43. The length and shape of the arms of the bell crank are so constructed that travel of cable C—3 to the left opens valve D—2 and closes valve D—4, while travel to the right opens valve D—4 and closes valve D—2. On the coke side of the oven, since the levers in boxes A—3 are reversed, travel of the cable to the left closes the waste gas valve and opens the lean gas valve, whereas travel to the right has the opposite effect.

As in passage P—6, a rectangular damper D—3 is placed in passage P—8 and is adapted to close off this passage, as required. Similar dampers are provided in passages P—5 and P—7 connecting the coke side valve boxes with chimney flue C—I.

The reversing mechanism for operating the lean gas and waste gas dampers is, of course, the same as briefly described in connection with the air and waste gas dampers of the other box. There is also a valve D—5 (see also Figs. 8 and 9) in each riser, G—21 and G—22, from the lean gas manifolds G—I and G—2 adapted to shut off the gas supply and to prevent leakage into valve boxes A—3 and A—4 when rich gas is being used for underfiring.

Reference to Figs. 1, 8 and 9 will disclose valves D—6 in the lean gas manifolds G—I and G—2. Valves D—6 are operated alternately during each reversal period in order completely to shut off the lean gas from one manifold at a time, so that fuel gas cannot flow into the chimney flues on the waste gas reversal. The closing of this valve prevents any lean gas from flowing into the valve boxes through the risers and on out to the chimney flues through passages P—7 or P—8 while both the lean gas inlet valves and the waste gas outlet valves are partly open during the process of reversing. Valves D—6 may be of any suitable type and may be operated by any appropriate means, as by a solenoid electrically connected in the usual manner with the clock-operated reversing valve mechanism.

In the operation of the oven as an entire unit, oven doors H—3 and H—4 are closed and sealed air-tight, as may be seen from Fig. 3. Coal is charged through the charging holes H—2 in the top of the oven (see also Fig. 2), and the cone-shaped piles are levelled off in the usual manner by a levelling rod introduced through a small door H—7 in the pusher side oven door. The charging hole covers H—5 are replaced and sealed air-tight. Fuel gas is then burned with preheated air in the flues underneath the coking chamber to provide a substantially uniform coking temperature for the entire area of the oven sole upon which the coal charge is supported. As is well-known by those skilled in the art, the coking temperature varies depending upon whether low or high carbonization is desired. Thus, a suitable temperature for low coking, such as about 600 to about 700° C., to a suitable temperature for high coking, for instance, about 1150 to about 1450° C., can be successfully used. Reversal periods of suitable duration are employed, as those skilled in the art will know, and a reversal about every 15 minutes has been found to give satisfactory results when underfiring with rich fuel gas and preheated air. When preheated lean fuel gas is burned in the flues with preheated air, a reversal of about 30 minutes duration gives more satisfactory results. An off-take pipe H—6 at the end of the oven provides an outlet for the gases evolved during coking, and these pass to the by-product plant. When the coal is coked, oven doors H—3 and H—4 are removed, and the coke is pushed in the customary way.

The operation of my improved broad coke oven will now be described particularly in conjunction with Figs. 18 and 19, which illustrate diagrammatically the flow of gases through the several flues, ducts, regenerators, dampers and valves, for the convenience of those skilled in the art.

When using lean fuel gas (Fig. 19), and assuming that regenerators R—2 and R—4 are being heated by the outgoing gases of combustion, waste gas damper D—2 (see also Fig. 14) of valve box A—4 is open, and fuel gas inlet valve D—4 in the same box is closed, permitting a flow of waste gas from regenerator R—4 along passage P—4 and through valve box A—4 and passage P—8 into chimney flue C—2. Likewise, waste gas damper V—2 (see also Fig. 10) in valve box A—2 is open, and air inlet valve V—1 in the same box is closed, permitting waste gas to flow from regenerator R—2 along passage P—2 and through valve box A—2 and passage P—6 into chimney flue C—2.

The lean gas to be preheated enters through valve D—4 in valve box A—3, waste gas damper D—2 in that box being closed. The gas flows along passage P—3 into the mushrooming chamber under regenerator R—3, where it spreads out, and then ascends uniformly through the hot checkerbrick in the regenerator, passing into ducts 4. Similarly, the air to be preheated enters through valve V—1 of valve box A—1, waste gas damper V—2 of box A—1 being closed. The air then flows along passage P—1 into the spacious chamber below regenerator R—1, where it mushrooms out, and then uniformly up through the hot checkerbrick. The heated air passes into the ducts 5 and, at the debouchment points of ducts 4 and 5 into heating flues 1, meets the hot fuel gas. (This point is the same as that for ducts 6 and 7 and flue 2 and is shown in detail at Fig. 7.) It will be observed that provision of relatively large gas spaces above and below the regenerators permits the gas (here, air) to spread out before entering the checkerbrick and thus slows down its passage through the regenerators, giving improved heat transfer. This preheated air is delivered at the firing end of each heating flue 1 in an amount suitable for the combustion of the preheated lean gas delivered there, and gas and air are mixed in the heating flues, so that combustion takes place simultaneously in all heating flues 1.

It is obvious from the construction of the heating flues, as detailed supra, that each heating flue 1 will have its own flame shooting across the width of the oven, a very short distance to travel. The products of combustion from heating flues 1 enter longitudinal flue 3 and, through flue 3, are introduced into the remaining heating flues 2. The filler blocks F, which are preferably employed and which are positioned in the ends of the heating flues adjacent to longitudinal flue 3, vary in size, decreasing in cross-section from those under the center of the oven toward those beneath its ends. This variation counteracts the tendency of the combustion gases to flow in greater volume into the heating flues 2 near the center than into the heating flues 2 near the end of the oven, to which the gases must travel a longer distance than to the center flues. The waste products are therefore fairly evenly distributed among heating flues 2. At the other end of flues 2, the volume of waste gas is divided between ducts 6 and 7 and flows downward into the mushrooming chambers above regenerators R—2 and R—4. These waste gases descend uniformly and at reduced velocity through the regenerators, giving up most of their heat to the checkerbrick, and flow into passages P—2 and P—4, whence they go to the stack, as above described. Thus, it will be observed that the oven of the invention is constructed in such manner that the gases which are being heated ascend and the gases which are giving up heat descend, whereby maximum heat economy and uniformity of operation are assured.

Upon reversal of the draft, with preheated gas and air entering heating flues 2 through ducts 6 and ducts 7, respectively, the flames burn simultaneously in flues 2, at the other end of the oven. From flues 2, the hot products of combustion pass into flue 3 and thence into heating flues 1. In this way, first one half of the oven and then the other is subjected to the highest temperature, so that the heat furnished throughout a full cycle is substantially uniform for the entire oven length. The center is obviously under exactly the same conditions as are the ends, so that there can be neither overcoking at the ends of the oven nor undercoking at its center. Besides that, no cold black spots are possible in the short transverse flues.

When the regenerators R—2 and R—4 are raised to the temperature necessary for preheating the lean gas and air, the directions of flow are changed by opening gas inlet valve D—4 in valve box A—4, air valve V—1 in box A—2, and waste gas dampers D—2 and V—2 in boxes A—3 and A—1, respectively, while closing lean gas valve D—4 in valve box A—3, air valve V—1 in box A—1, and waste gas valves D—2 and V—2 in boxes A—4 and A—2, respectively. Air then enters through valve box A—2 and flows through passage P—2 and up through regenerator R—2 into ducts 7. Lean gas enters through valve box A—4 and flows through passage P—4, up through regenerator R—4, and into ducts 6. After burning in flues 2, the waste products flow down through regenerators R—1 and R—3 and out through boxes A—1 and A—3 into chimney flue C—1.

The operation of the air valve boxes is clear from Figs. 10 to 13. In the position shown for boxes A—2 on the pusher side of the oven, cable C—3 has traveled to the right, moving the straight arm of bell crank L—1 in the same direction. The bell crank has turned shaft S—1 to which it is keyed. This movement of the shaft has raised valve V—1 from its seat. The curved arm of bell crank L—1 has been moved downward in an arc and has pushed down upon adjustable rod L—2, which has in turn depressed lever L—3. Lever L—3 has turned shaft S—2, to which it is keyed, and this in turn has lowered damper V—2 into its seat. In similar but reverse fashion, the travel of the cable to the right has opened damper V—2 and closed air inlet valve V—1 on the coke side boxes A—1 (not shown in Figs. 10 to 13). The positions of the valves when the cable has traveled to the left are illustrated by Figs. 8 and 9, which show the arrangement of the boxes during such reversal. The order is of course reversed by reversal of travel of the cable. It is also to be noted from the figures that air valves D—1 on the lean gas valve boxes A—3 and A—4 are closed, as they remain during operation with lean gas.

The operation of the lean gas valve boxes is clear from a scrutiny of Figs. 14 to 17. As shown for boxes A—4 on the pusher side of the oven, cable C—3 has traveled to the left, moving the straight arm of bell crank L—1 in the same direction. As the valve stem D—15 has been unkeyed from the shaft S—1 to which the bell crank is keyed, there has been no movement of air valve D—1, which remains tightly closed. The curved arm of bell crank L—1 has been moved upward in an arc and has pulled up upon adjustable rod L—2, which has in turn raised lever L—3. Lever L—3 has turned shaft S—2, to which it is keyed, and this in turn has turned bell crank L—4. The movement of bell crank L—4 has both closed lean fuel gas valve D—4 and opened waste gas valve D—2. In similar but reverse operation, the travel of the cable to the left has opened gas inlet valve D—4 and closed waste gas damper D—2 of the coke side boxes A—3 (not shown in Figs. 14 to 17). The travel of the cable to the right has the opposite effect.

Stack draft is used for drawing air into the regenerators and for removing the gases of combustion. The stack draft for each separate coke oven is regulated by the position of the plate dampers V—3 and D—3, which are held in position in the passages to the chimney flues by quadrants Q. The air valves are equipped with air-regulating bars B, as mentioned supra. Bars B are removable, and the volume of air to each regenerator is controlled by the size and number of removable bars used to regulate the size of the openings into the body of the box. In providing lean gas for heating the ovens, the fuel gas, under a slight and constant pressure, is conducted through supply manifolds G—1 and G—2 and into risers G—21 and G—22 (see also Figs. 2 and 3). Its supply to the burners is regulated by brick slides N—3 in the ducts which connect the regenerators with the heating flues, as described supra and illustrated at Fig. 7.

The adjustment of the various valves and the circulation of gases through the heating flues, regenerators, and other associated parts when using rich fuel gas and preheated air will be best understood from Fig. 18. When using rich fuel gas and preheated air, all connections are the same as described for lean fuel gas, except that the rich fuel gas is not preheated and that all regenerators are used alternately for either preheating air or for being heated by the hot waste gases. Assuming that regenerators R—2 and R—4 are being heated by the outgoing hot gases of combustion, air to be preheated enters through dampers V—1 of valve box A—1 and D—1 of box A—3 and is introduced by means of passages P—1 and P—3, respectively, into the regenerators R—1 and R—3, in which the air ascends. After having passed through the regenerators, the preheated air is brought into heating flues 1 through ducts 4 and 5. The rich fuel gas is introduced through a gas manifold G—31 and a riser G—4 into gun brick 11. The gas passes through burner nozzles N—1 in ducts 13 to heating flues 1, where it mixes with the preheated air from ducts 4 and 5 and is burned. The products of combustion from heating flues 1 enter common connecting flue 3 and are divided again among flues 2. The volume of waste gas flowing through flues 2 is divided again between flues 6 and 7 and flows downward through regenerators R—2 and R—4, along passages P—2 and P—4, and out of valve boxes A—2 and A—4 into chimney flue C—2.

During the alternate reversal, regenerators R—1 and R—3 are being heated, and the air is being preheated in regenerators R—2 and R—4. During this reversal, the rich fuel gas is shut off from gun brick gas supply channel 11 and ducts 13 and flows, instead, through gas manifold pipe G—32, gun brick 12 and nozzles N—1 in ducts 14. Combustion now takes place in heating flues 2, the waste gas flowing through flue 3 out flues 1 into regenerators R—1 and R—3.

The operation of the air valve boxes is, of course, exactly the same as when lean gas is being used, as detailed in connection with Figs. 10 to 13, supra. The valve boxes A—3 and A—4, employed for lean gas when it is desired to use lean gas for fuel, are now converted into additional air boxes by adjusting set screws D—16 on each box (see Fig. 14), thus keying the air valves D—1 to the bell cranks L—1. In this way, the travel of cable C—3 to the left opens air valve D—1 of box A—3 (see Fig. 9) just as it opens air valve V—1 of box A—1 and air passes to both regenerators R—1 and R—3 to be preheated. No lean gas is used, of course, and hence the opening of valve D—4 leading to the lean gas manifold (described supra in connection with Figs. 14 to 17) has no effect on the system, the manifolds being sealed off by the closing of the valves D—5 in the risers. The travel of the cable to the left opens waste gas valves V—2 and D—2 in boxes A—2 and A—4 on the pusher side of the oven, just as in operation with lean gas. Travel to the right of the cable reverses the operations.

It will be appreciated by those skilled in the coke oven art, from the foregoing description, that my convertible broad coke oven possesses extreme simplicity of operation. Furthermore, it is to be noted that the ease with which the operator can change over from lean gas, such as producer or blast furnace gas, to rich gas, such as coke oven gas, or vice versa, in my convertible broad coke oven has never before been even approached by the prior attempts or proposals. The foregoing, with the other advantageous features described herein, gives my novel and improved combination a flexibility of operation never before attained by the coke oven art.

It will also be appreciated that, with my novel broad coke ovens, it is possible to produce a coke which is far more suitable for domestic purposes than was the coke produced by the high, narrow ovens of the prior art. As has been explained supra, coke for domestic use should have an open, free-burning cell structure, and this type of coke can be made in my sole-fired broad oven. Leveling off the coal charge in my oven over the entire horizontal heating surface gives a thin layer of about 10 to about 18 inches in depth spread evenly over a surface about 35 to about 45 feet long and about 8 to about 12 feet wide. The free flow of hot, evolved gases through the thin coal charge and the low pressure to which the coal in the plastic state is subjected create entirely different carbonizing conditions from those prevailing in the high, narrow ovens. An open cell structure results, and, in addition to the fact that a different molecular arrangement of the coke structure is developed, the carbonizing reaction is accompanied by less than the amount of cracking of by-products which resulted from contact with the hot, vertical surfaces of the prior art. Thus, the broad, flat oven herein described can be operated to leave a suitable volume of volatile matter in the coke to insure the free-burning properties desirable in domestic coke. It will, of course, be understood that an appropriate mixture of coals can as readily produce a high grade metallurgical coke in my broad ovens, so that my ovens have the great advantage of being adaptable to the production of either domestic or metallurgical coke.

Although the present invention has been disclosed in connection with a preferred embodiment thereof, variations and modifications may be resorted to by those skilled in the art, without departing from the principles of the invention. Thus, while a preferred arrangement of valves has been described and a preferred reversing mechanism for their operation has been indicated, those skilled in the coke oven art will readily perceive that other operative valvular means could be substituted for my arrangement, and that other valve-actuating means could be used with satisfactory results. It will also be observed that, while I have preferred to employ a regenerative system under each oven which comprises two sets of vertical regenerators with each set comprising two regenerators as a single parallel pair, sets of more than one pair could be satisfactorily used with relatively minor alterations and adjustments. Moreover, while I have described my invention particularly with reference to the coking of coal, it will be readily understood that it is as easily adaptable to the coking of any carbonaceous material, such as peat, tar, lignite, pitch, culm waste and other low grade coals, fuel oil, bunker oils and other petroleum products, and the like. I consider all of these variations and modifications as within the true spirit and scope of the present invention, as disclosed in the foregoing description and defined by the appended claims.

I claim:

1. In a battery of by-product coke ovens of the broad rectangular sole-fired type, the combination in each oven of a long horizontal coking chamber broader than its height, adapted to be sealed against the admission of air and having a sole thereunder; a plurality of horizontal parallel heating flues underneath the sole of the chamber for heating it, said flues arranged side by side transversely of the chamber; two sets of parallel vertical regenerators lying below and transverse to the heating flues and communicably connected therewith, each set of regenerators being adapted alternately to preheat air and lean fuel gas and to remove heat from hot products of combustion, whereby a regenerative system is provided to supply preheated air and preheated lean fuel gas to the heating flues and to remove hot products of combustion therefrom wherein air and lean fuel gas which are being heated can ascend and combustion products which are being cooled can descend, and two chimney flues to a stack, each located below a set of regenerators and lying transversely with respect to the oven substantially for the length of the battery to serve all the ovens therein and each flue being communicably connected and adjacent to one set of regenerators and adapted for alternate operation in removing combustion products therefrom whereby lean fuel gas and air entering the oven make only a single transit of the length of the oven before their exit therefrom as waste gas.

2. A by-product coke oven of the broad rectangular sole-fired type which comprises a broad horizontal coking chamber having a sole thereunder and adapted to be sealed against the admission of air; a plurality of horizontal parallel heating flues arranged side by side underneath the sole of the chamber for heating it, each flue extending transversely of and substantially from side to side of the oven for substantially its entire breadth and said plurality of heating flues underlying the coking chamber for substantially the entire length of the oven, said flues being arranged in two sets adjacent respectively to opposite ends of the oven and to each other; transverse partition walls separating the flues from each other and all being spaced from one side of the oven to form a common connecting flue extending longitudinally of and substantially from end to end of the oven, thereby providing two sets of parallel-connected heating flues integrated as a heating system under substantially the entire sole area of said coking chamber; burning means located in each transverse heating flue at the end thereof opposite the common connecting flue, whereby flames issuing from said burning means can shoot across the width of the oven into said common connecting flue; a set of vertical regenerators at each end of the oven, having inner portions of checkerbrick and arranged in parallel pairs located beneath the heating flues and communicably connected at one side of the oven to the burning means end of one set of heating flues; air inlets at each end of said oven for supplying air to the set of regenerators connected to the burning means in the set flues adjacent to the same end of the oven; two chimney flues extending substantially transversely to the coking chamber and connected to a common stack, one of said chimney flues being adjacent and connected to one set of regenerators and the other chimney flue being adjacent and connected to the other set of regenerators, each of the two chimney flues being arranged for independent and alternate use for conducting combustion products from the regenerators connected therewith to the common stack; gas passages located below the regenerators and communicably connecting each set of regenerators, respectively, to the air inlets and chimney flue at the same end of the oven, whereby a broad by-product coke oven is provided with substantially uniform heating conditions over the entire sole area of the coking chamber whereby coal in said chamber can be coked substantially uniformly.

3. A by-product coke oven of the broad rectangular sole-fired type which comprises a broad horizontal coking chamber having a sole thereunder and adapted to be sealed against the admission of air; a plurality of horizontal parallel heating flues arranged side by side underneath the sole of the chamber for heating it, each flue extending transversely of and substantially from side to side of the oven for substantially its entire breadth and said plurality of heating flues underlying the coking chamber for substantially the entire length of the oven, said flues being arranged in two sets adjacent respectively to opposite ends of the oven and to each other; transverse partition walls separating the flues from each other and all being spaced from one side of the oven to form a common connecting flue extending longitudinally of and substantially from end to end of the oven, thereby providing two sets of parallel-connected heating flues integrated as a heating system under substantially the entire sole area of said coking chamber; burning means located in each transverse heating flue at the end thereof opposite the common connecting flue, whereby flames issuing from said burning means can shoot across the width of the oven into said common connecting flue; a set of vertical regenerators at each end of the oven, having inner portions of checkerbrick and arranged in parallel pairs located beneath the heating flues and communicably connected at one side of the oven to the burning means end of one set of heating flues; a plurality of connecting ducts communicating directly with the upper portions of said regenerators and connecting each of said regenerators with a plurality of said heating flues, whereby air admitted to one set of parallel pairs of regenerators can be furnished through the connecting ducts to the burning means in one set of heating flues and can there be burned with rich fuel gas, whereby hot products of combustion therefrom can flow from said set of heating flues through the common connecting flue and into the other set of heating flues and whereby said combustion products can pass therefrom into the other set of parallel pair of regenerators to give up residual heat thereto; air inlets at each end of said oven for supplying air to the set of regenerators connected to the burning means in the set of flues adjacent to the same end of the oven; two chimney flues extending substantially transversely to the coking chamber and connected to a common stack, one of said chimney flues being adjacent and connected to one set of regenerators and the other chimney flue being adjacent and connected to the other set of regenerators, each of the two chimney flues being arranged for independent and alternate use for conducting combustion products from the regenerators connected therewith to the common stack; and gas passages located below the regenerators and communicably connecting the lower parts of each set of regenerators, respectively, to the air inlets and chimney flue at the same end of the oven, thereby causing air which is being heated to ascend and causing waste gas which is being cooled to descend, whereby a broad by-product coke oven is provided with substantially uniform heating conditions over the entire sole area of the coking chamber whereby coal in said chamber can be coked substantially uniformly.

4. A by-product coke oven of the broad rectangular sole-fired type which comprises a broad horizontal coking chamber having a sole thereunder and adapted to be sealed against the admission of air; a plurality of horizontal parallel heating flues arranged side by side underneath the sole of the chamber for heating it, each flue extending transversely of and substantially from side to side of the oven for substantially its entire breadth and said plurality of heating flues underlying the coking chamber for substantially the entire length of the oven, said flues being arranged in two sets adjacent respectively to opposite ends of the oven and to each other; transverse partition walls separating the flues from each other and all being spaced from one side of the oven to form a common connecting flue extending longitudinally of and substantially from end to end of the oven, thereby providing two sets of parallel-connected heating flues integrated as a heating system under substantially the entire sole area of said coking chamber; burning means located in each transverse heating flue at the end thereof opposite the common connecting flue, whereby flames issuing from said burning means can shoot across the width of the oven into said common connecting flue; a set of vertical regenerators at each end of the oven, having inner portions of checkerbrick and arranged in parallel pairs located beneath the heating flues and communicably connected at one side of the oven to the burning means end of one set of heating flues; a plurality of connecting ducts communicating directly with the upper portions of said regenerators and connecting each of said regenerators with a plurality of said heating flues, whereby air admitted to one side of one set of parallel pairs of regenerators can be furnished to the burning means in one set of heating flues and can there be burned with lean fuel gas admitted to the other side of the same set of regenerators, whereby hot products of combustion therefrom can flow from said set of heating flues through the common connecting flue and into the other set of heating flues and whereby said combustion products can pass therefrom into the other set of parallel pairs of regenerators to give up residual heat thereto; air inlets at each end of said oven for supplying air to the set of regenerators connected to the burning means in the set of flues adjacent to the same end of the oven; two chimney flues extending substantially transversely to the coking chamber and connected to a common stack, one of said chimney flues being adjacent and connected to one set of regenerators and the other chimney flue being adjacent and connected to the other set of regenerators, each of the two chimney flues being arranged for independent and alternate use for conducting combustion products from the regenerators connected therewith to the common stack; and gas passages located below the regenerators and communicably connecting the lower parts of each set of regenerators, respectively, to the air inlets and chimney flue at the same end of the oven, thereby causing air and lean fuel gas which are being heated to ascend and causing waste gas which is being cooled to descend, whereby a broad by-product coke oven is provided with substantially uniform heating conditions over the entire sole area of the coking chamber whereby coal in said chamber can be coked substantially uniformly.

5. A by-product coke oven of the broad rectangular sole-fired type which comprises a broad horizontal coking chamber having a sole thereunder and adapted to be sealed against the admission of air; a plurality of horizontal parallel heating flues arranged side by side underneath the sole of the chamber for heating it, each flue extending transversely of and substantially from side to side of the oven for substantially its entire breadth and said plurality of heating flues underlying the coking chamber for substantially the entire length of the oven, said flues being arranged in two sets adjacent respectively to opposite ends of the oven and to each other; transverse partition walls separating the flues from each other and all being spaced from one side of the oven to form a common connecting flue extending longitudinally of and substantially from end to end of the oven, thereby providing two sets of parallel-connected heating flues integrated as a heating system under substantially the entire sole area of said coking chamber; burning means located in each transverse heating flue at the end thereof opposite the common connecting flue, whereby flames issuing from said burning means can shoot across the width of the oven into said common connecting flue; a set of vertical regenerators at each end of the oven, having inner portions of checkerbrick and arranged in parallel pairs located beneath the heating flues and communicably connected at one side of the oven to the burning means end of one set of heating flues; a plurality of connecting ducts communicating directly with the upper portions of said regenerators and connecting each of said regenerators with a plurality of said heating flues, whereby air admitted to one set of parallel pairs of regenerators can be furnished through the connecting ducts to the burning means in one set of heating flues and can there be burned with rich fuel gas, whereby hot products of combustion therefrom can flow from said set of heating flues through the common connecting flue and into the other set of heating flues and whereby said combustion products can pass therefrom into the other set of parallel pairs of regenerators to give up residual heat thereto; air inlets at each end of said oven for supplying air to the set of regenerators connected to the burning means in the set of flues adjacent to the same end of the oven; two chimney flues extending substantially transversely to the coking chamber and connected to a common stack, one of said chimney flues being adjacent and connected to one set of regenerators and the other chimney flue being adjacent and connected to the other set of regenerators, each of the two chimney flues being arranged for independent and alternate use for conducting combustion products from the regenerators connected therewith to the common stack; gas passages located below the regenerators and communicably connecting the lower parts of each set of regenerators, respectively, to the air inlets and chimney flue at the same end of the oven, thereby causing air which is being heated to ascend and causing waste gas which is being cooled to descend, and means located in each transverse heating flue to control the draft required therein, thereby regulating the velocity of flames and waste gases issuing from the burning means in each of said heating flues to insure proper heat transfer from the heating flues over the entire oven sole, whereby a broad by-product coke oven is provided with substantially uniform heating conditions over the entire sole area of the coking chamber whereby coal in said chamber can be coked substantially uniformly.

6. A by-product coke oven of the broad rectangular sole-fired type which comprises a broad horizontal coking chamber having a sole thereunder and adapted to be sealed against the admission of air; a plurality of horizontal parallel heating flues arranged side by side underneath the sole of the chamber for heating it, each flue extending transversely of and substantially from side to side of the oven for substantially its entire breadth and said plurality of heating flues underlying the coking chamber for substantially the entire length of the oven, said flues being arranged in two sets adjacent respectively to opposite ends of the oven and to each other; transverse partition walls separating the flues from each other and all being spaced from one side of the oven to form a common connecting flue extending longitudinally of and substantially from end to end of the oven, thereby providing two sets of parallel-connected heating flues integrated as a heating system under substantially the entire sole area of said coking chamber; burning means located in each transverse heating flue at the end thereof opposite the common connecting flue, whereby flames issuing from said burning means can shoot across the width of the oven into said common connecting flue; a set of vertical regenerators at each end of the oven, having inner portions of checkerbrick and arranged in parallel pairs located beneath the heating flues and communicably connected at one side of the oven to the burning means end of one set of heating flues; a plurality of connecting ducts communicating directly with the upper portions of said regenerators and connecting each of said regenerators with a plurality of said heating flues, whereby air admitted to one side of one set of parallel pairs of regenerators can be furnished to the burning means in one set of heating flues and can there be burned with lean fuel gas admitted to the other side of the same set of regenerators, whereby hot products of combustion therefrom can flow from said set of heating flues through the common connecting flue and into the other set of heating flues and whereby said combustion products can pass therefrom into the other set of parallel pairs of regenerators to give up residual heat thereto; air inlets at each end of said oven for supplying air to the set of regenerators connected to the burning means in the set of flues adjacent to the same end of the oven; two chimney flues extending substantially transversely to the coking chamber and connected to a common stack, one of said chimney flues being adjacent and connected to one set of regenerators and the other chimney flue being adjacent and connected to the other set of regenerators, each of the two chimney flues being arranged for independent and alternate use for conducting combustion products from the regenerators connected therewith to the common stack; gas passages located below the regenerators and communicably connecting the lower parts of each set of regenerators, respectively, to the air inlets and chimney flue at the same end of the oven, thereby causing air and lean fuel gas which are being heated to ascend and causing waste gas which is being cooled to descend, and means located in each transverse heating flue to control the draft required therein, thereby regulating the velocity of flames and waste gases issuing from the burning means in each of said heating flues to insure proper heat transfer from the heating flues over the entire oven sole, whereby a broad by-product coke oven is provided with substantially uniform heating conditions over the entire sole area of the coking chamber whereby coal in said chamber can be coked substantially uniformly.

7. A coke oven battery comprising a plurality of broad by-product coke ovens arranged side by side each of which comprises a broad horizontal coking chamber having a sole thereunder and adapted to be sealed against the admission of air; a plurality of horizontal parallel heating flues arranged side by side underneath the sole of the chamber for heating it, each flue extending transversely of and substantially from side to side of the oven for substantially its entire breadth and said plurality of heating flues underlying the coking chamber for substantially the entire length of the oven, said flues being arranged in two sets; transverse partition walls separating the flues from each other and all being spaced from one side of the oven to form a common connecting flue extending longitudinally of and substantially from end to end of the oven, thereby providing two sets of parallel-connected heating flues integrated as a heating system under substantially the entire sole area of said coking chamber; burning means located in each transverse heating flue at the end thereof opposite the common connecting flue, whereby flames issuing from said burning means can shoot across the width of the oven into said common connecting flue; four valve boxes located outside the oven and arranged in pairs at opposite ends of the oven; a set of vertical regenerators at each end of the oven, having inner portions of checkerbrick and arranged in parallel pairs located beneath the heating flues and communicably connected at one side of the oven to the burning means end of one set of heating flues; a plurality of connecting ducts having a number equal to twice the number of transverse heating flues and arranged in pairs, each pair of said ducts communicating directly with the burning means in one transverse heating flue and each duct in said pair connecting said heating flue with the upper portion of one of a pair of regenerators, whereby air admitted to one set of parallel pairs of regenerators can be furnished through the pairs of connecting ducts to the burning means in one set of heating flues and can there be burned with rich fuel gas, whereby hot products of combustion therefrom can flow from said set of heating flues through the common connecting flue and into the other set of heating flues and whereby said combustion products can pass therefrom into the other set of parallel pairs of regenerators to give up residual heat thereto; four gas passages located below the regenerators and arranged in pairs, each pair of said gas passages communicably connecting the lower parts of each set of regenerators, respectively, to the pair of valve boxes at the same end of the oven, and each gas passage in each of said pairs of gas passages communicably connecting the regenerators on each side of each set of regenerators, respectively, to one of said valve boxes, thereby causing air which is being heated to ascend and causing waste gas which is being cooled to descend; two chimney flues extending substantially transversely to each coking chamber for substantially the entire length of the battery of ovens and connected to a common stack, one of said chimney flues being adjacent and connected via valve boxes to the sets of regenerators at one side of the battery of ovens and the other chimney flue being adjacent and connected via valve boxes to the other sets of regenerators at the other side of the battery of ovens, each of the two chimney flues being arranged for independent and alternate use for conducting combustion products from the regenerators connected therewith to the common stack; four sets of valves, each located in one of the four valve boxes and adapted so to cooperate with each other that air to be preheated can be admitted in one pair of valve boxes while combustion products are passing out of the other pair of valve boxes, and vice versa; and an automatic valve-actuating means to provide such alternate cooperation, thereby providing for reversal of the direction of flow of hot gases through the heating flues and regenerators; whereby a broad by-product coke oven is provided with substantially uniform heating conditions over the entire sole area of the coking chamber and whereby coal in said chamber can be coked substantially uniformly.

8. The by-product coke oven construction as set forth in claim 7, wherein each of the two sets of vertical regenerators comprises two regenerators as a single parallel pair, both regenerators connected by a plurality of connecting ducts with a single set of heating flues.

9. The construction as set forth in claim 7, wherein each valve box comprises a housing, an air inlet valve having a port, slightly projecting shelves in said port adapted to support air-regulating bars whereby the supply of air to the heating flues can be controlled, a waste gas exit valve, and actuating means to cause said valve to alternate in operation whereby the air inlet valve is opened when the waste gas valve is closed and vice versa.

10. A coke oven battery comprising a plurality of broad by-product coke ovens arranged side by side each of which comprises a broad horizontal coking chamber having a sole thereunder and adapted to be sealed against the admission of air; a plurality of horizontal parallel heating flues arranged side by side underneath the sole of the chamber for heating it, each flue extending transversely of and substantially from side to side of the oven for substantially its entire breadth and said plurality of heating flues underlying the coking chamber for substantially the entire length of the oven, said flues being arranged in two sets; transverse partition walls separating the flues from each other and all being spaced from one side of the oven to form a common connecting flue extending longitudinally of and substantially from end to end of the oven, thereby providing two sets of parallel-connected heating flues integrated as a heating system under substantially the entire sole area of said coking chamber; burning means located in each transverse heating flue at the end thereof opposite the common connecting flue, whereby flames issuing from said burning means can shoot across the width of the oven into said common connecting flue; four valve boxes located outside the oven and arranged in pairs at opposite ends of the oven; a set of vertical regenerators at each end of the oven, having inner portions of checkerbrick and arranged in parallel pairs located beneath the heating flues and communicably connected at one side of the oven to the burning means end of one set of heating flues; a plurality of connecting ducts having a number equal to twice the number of transverse heating flues and arranged in pairs, each pair of said ducts communicating directly with the burning means in one transverse heating flue and each duct in said pair connecting said heating flue with the upper portion of one of a pair of regenerators, whereby air admitted to one side of one set of parallel pairs of regenerators can be furnished, through the ducts on the same side in each pair of said connecting ducts, to the burning means in one set of heating flues and can there be burned with lean fuel gas admitted to the other side of the same set of regenerators and thence to the connecting ducts on said other side, whereby hot products of combustion therefrom can flow from said set of heating flues through the common connecting flue and into the other set of heating flues and whereby said combustion products can pass therefrom into the other set of parallel pairs of regenerators to give up residual heat thereto; four gas passages located below the regenerators and arranged in pairs, each pair of said gas passages communicably connecting the lower part of each set of regenerators, respectively, to the pair of valve boxes at the same end of the oven, and each gas passage in each of said pairs of gas passages communicably connecting the regenerators on each side of each set of regenerators, respectively, to one of said valve boxes, thereby causing air and lean fuel gas which are being heated to ascend and causing waste gas which is being cooled to descend; two chimney flues extending substantially transversely to each coking chamber for substantially the entire length of the battery of ovens and connected to a common stack, one of said chimney flues being adjacent and connected via valve boxes to the sets of regenerators at one side of the battery of ovens and the other chimney flue being adjacent and connected via valve boxes to the other sets of regenerators at the other side of the battery of ovens, each of the two chimney flues being arranged for independent and alternate use for conducting combustion products from the regenerators connected therewith to the common stack; four sets of valves, each set located in one of said valve boxes and adapted so to cooperate with each other that air to be preheated can be admitted in one valve box and lean fuel gas to be preheated can be admitted in a second valve box while combustion products are passing out of both of the other valve boxes, and vice versa; and an automatic valve-actuating means to provide such alternate cooperation, thereby providing for reversal of the direction of flow of hot gases through the heating flues and regenerators; whereby a broad by-product coke oven is provided with substantially uniform heating conditions over the entire sole area of the coking chamber and whereby coal in said chamber can be coked substantially uniformly.

11. The by-product coke oven construction as set forth in claim 10, wherein each of the two sets of vertical regenerators comprises two regenerators as a single parallel pair, both regenerators connected by a plurality of connecting ducts with a single set of heating flues.

12. The by-product coke oven construction as set forth in claim 10, wherein each valve box in each pair of valve boxes comprises a housing; an air inlet valve having a port; slightly projecting shelves in said port adapted to support air-regulating bars whereby the supply of air to the heating flues can be controlled; a waste gas exit valve; and actuating means to cause said valve to alternate in operation whereby the air inlet valve is opened when the waste gas valve is closed and vice versa; and wherein one valve box in each pair of valve boxes further comprises a lean fuel gas inlet valve communicably connected through a riser to a gas manifold; means to seal off said gas manifold from communication with said lean fuel gas inlet valve; means to cause the air inlet valve to remain closed; and actuating means to cause said lean fuel gas valve and the waste gas exit valve to alternate in operation whereby the lean fuel gas valve is opened when the waste gas valve is closed and vice versa, thereby providing in each pair of valve boxes one valve box adapted to be used for the admission of air to be preheated and for the removal of combustion products alternately and the other valve box adapted to be used for the admission alternatively of air or of lean fuel gas to be preheated and for the removal of combustion products alternately.

13. In a battery of by-product coke ovens of the broad rectangular sole-fired type, the combination in each oven of a long horizontal coking chamber broader than its height, adapted to be sealed against the admission of air and having a sole thereunder; a plurality of horizontal parallel heating flues underneath the sole of the chamber for heating it, said flues being arranged side by side transversely of the chamber in two sets; a longitudinal channel extending from each end of the oven underneath each set of transverse heating flues and communicably connected with every heating flue in said set to supply rich fuel gas thereto; two sets of parallel vertical regenerators lying below and transverse to the heating flues and communicably connected therewith, each set of regenerators being adapted alternately to preheat air and to remove heat from hot products of combustion, whereby a regenerative system is provided to supply preheated air to the heating flues and to remove hot products of combustion therefrom wherein air which is being heated can ascend and combustion products which are being cooled can descend; and two chimney flues extending substantially transversely to each coking chamber substantially the entire length of the battery of ovens and connected to a common stack, one of said chimney flues being adjacent and connected via valve boxes to the sets of regenerators at one side of the battery of ovens and the other chimney flue being adjacent and connected via valve boxes to the other sets of regenerators at the other side of the battery of ovens, each of the two chimney flues being arranged for independent and alternate use for conducting combustion products from the regenerators connected therewith to the common stack; whereby air entering the oven makes only a single transit of the length of the oven before its exit therefrom as waste gas.

CHARLES H. HUGHES.